May 1, 1951 — G. L. BATES — 2,551,235
BALE STACKER

Filed Feb. 25, 1949 — 2 Sheets-Sheet 1

INVENTOR.
Grant L. Bates,
BY Victor J. Evans & Co.
ATTORNEYS

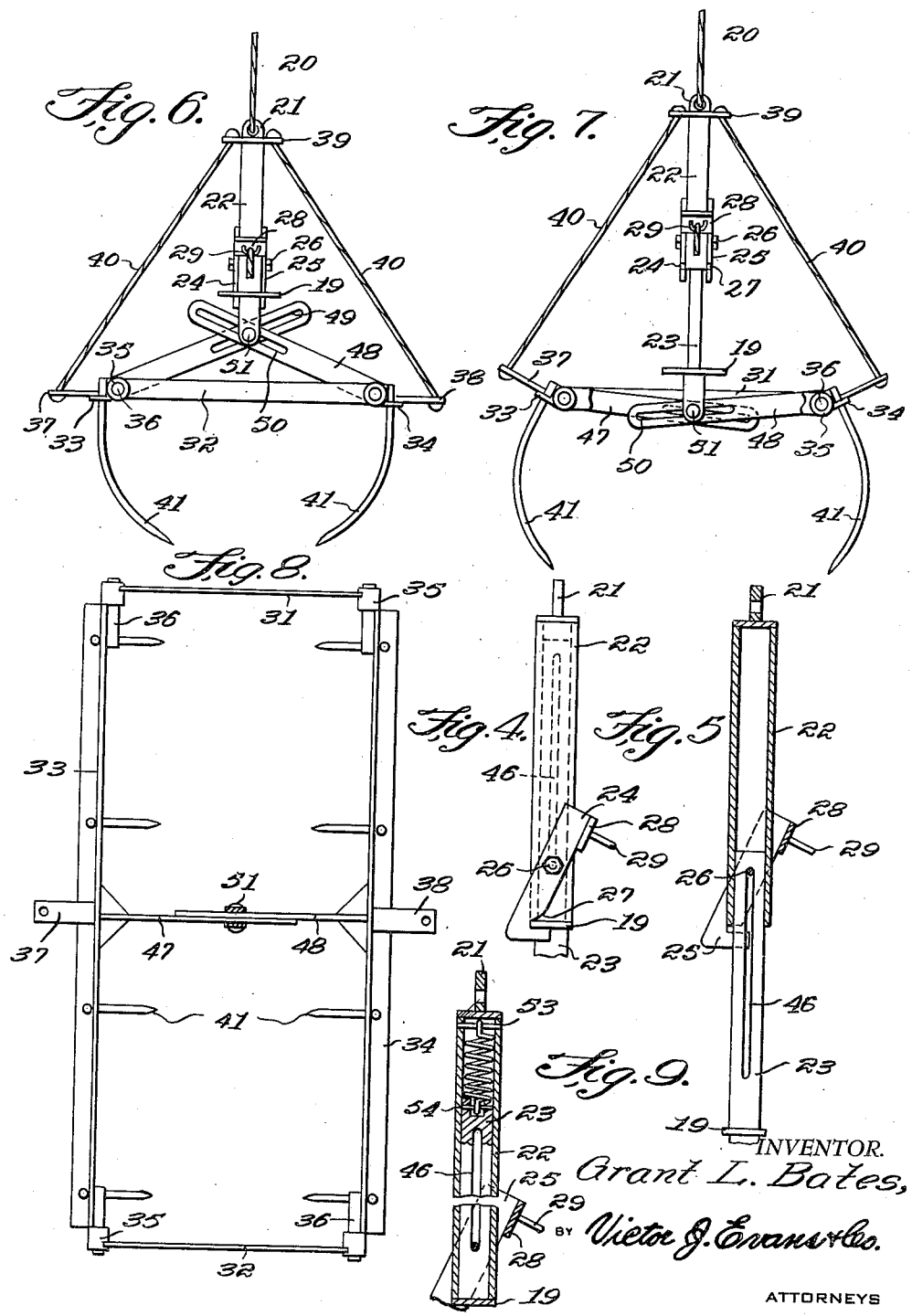

Patented May 1, 1951

2,551,235

UNITED STATES PATENT OFFICE 2,551,235

BALE STACKER

Grant L. Bates, Murtaugh, Idaho

Application February 25, 1949, Serial No. 78,349

2 Claims. (Cl. 294—107)

This invention relates to grappling equipment, and more particularly to a fork for handling bales of hay, straw, and the like.

The object of the invention is to provide a fork for use with a hoist which will grasp a plurality of bales of hay and straw whereby the bales can be elevated and conveyed to a desired location and released for stacking at the desired spot.

A further object of the invention is to provide a fork which will grasp a plurality of bales of hay or straw whereby the bales can be elevated and stacked at a desired location without damaging the bales.

Another object of the invention is to provide a bale stacker which is extremely simple and inexpensive to manufacture.

Other objects and advantages will become apparent during the course of the following description.

In the accompanying drawings, forming a part of this application, and in which like numerals are used to designate like parts throughout the same:

Figure 4 is a side elevational view of the support member;

Figure 5 is a vertical sectional view of the support member, showing the position of the parts thereof when the bale stacker is in opened position;

Figure 6 is an end elevational view of a modified form of the bale stacker, with the device in closed position;

Figure 7 is a view similar to Figure 6, but showing the bale stacker in opened position;

Figure 8 is a horizontal cross sectional view of the device of Figure 6; and

Figure 9 is a vertical sectional view of a modified support member.

Figure 1:
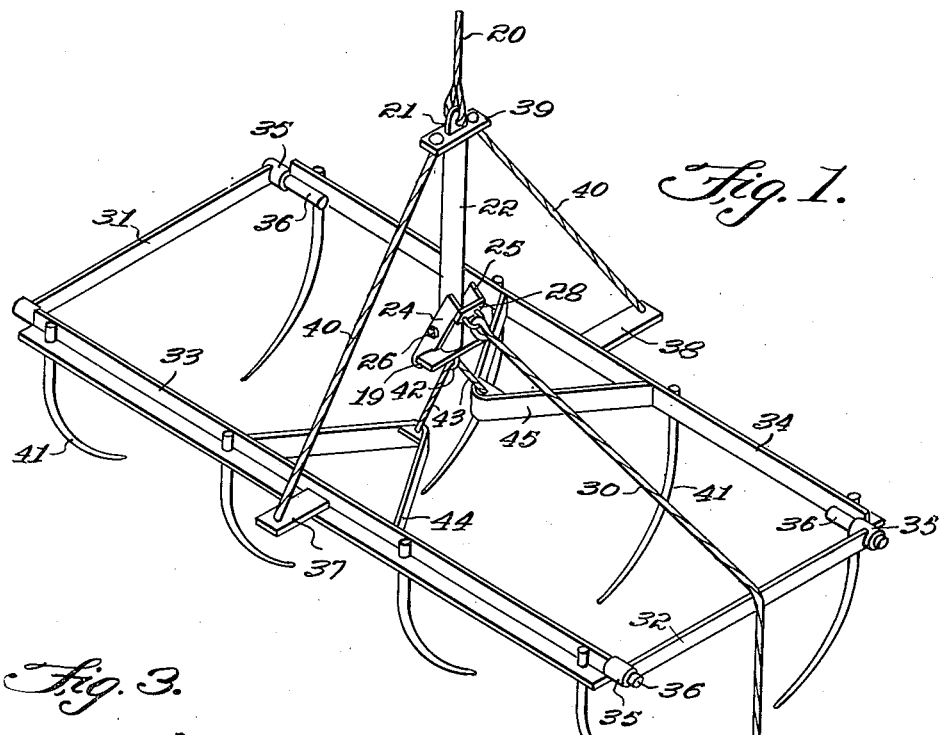
Figure 1 is a perspective view of the bale stacker, according to the present invention.

Referring in detail to Figures 1 to 5 inclusive of the drawings, the numeral 20 designates a cable or rope which extends from a suitable hoist or derrick (not shown). The cable 20 is secured to an apertured ear 21 which projects from the top of a hollow housing 22. The housing 22 has its lower end open, and mounted for telescopic movement in the housing 22 is a tubular member 23. Arranged transversely across the lower end of the tubular member 23 and secured thereto, as by welding, is a latch bar 19. Arranged on opposite sides of the housing 22 is a pair of spaced strips 24 and 25, the strips 24 and 25 being pivotally connected to the housing 22 by means of a bolt and nut assembly 26.

Each of the strips 24 and 25 are provided with a slot 27 for receiving therein the latch bar 19 when the tubular member 23 is in its uppermost position, so that downward movement of the tubular member 23 can be controlled as desired by the pivotal movement of the strips 24 and 25. A cross member 28 extends between the strips 24 and 25 and is secured thereto, as by welding, there being a U-bolt 29 secured to the cross member 28. An actuating cable 30 has one end connected to the bolt 29, and the other end of the cable 30 extends to a desired location and is adapted to be gripped by the hands so that the user can cause pivotal movement of the strips 24 and 25 to release the tubular member 23 as desired.

Arranged below the tubular member 23 is a pair of end bars 31 and 32. The bars 31 and 32 are arranged in spaced parallel relation with respect to each other, and extending between the bars 31 and 32 is a pair of angle iron straps 33 and 34. The straps 33 and 34 are hingedly connected to the bars 31 and 32 and this hinged connection includes a sleeve 35 arranged at the junction of each of the straps and bars. Thus, the end bar 31 extends between a pair of the sleeves 35 and the bar has its ends secured to the sleeves, while the other end bar 32 also has its ends secured, as by welding, to the other pair of sleeves 35. Rotatably positioned in each of the sleeves 35 is a pin or shaft 36, and the pins 36 each have one end secured, as by welding, to the corresponding side strap. Thus, the side straps 33 and 34 are hingedly connected to the bars 31 and 32.

A finger 37 projects from the side strap 33 and is secured thereto, as by welding, and a corresponding or second finger 38 projects from the other strap 34 and is secured thereto as by welding. A plate 39 is arranged transversely across the top of the housing 22 and is secured thereto, and a pair of cables 40 extend between the plate 39 and the fingers 37 and 38 and are secured thereto.

Arranged in spaced parallel relation along each of the straps 33 and 34, and secured thereto, is a plurality of coacting, curved tynes, or hooks 41. The hooks 41 on the strap 33 coact with the hooks 41 on straps 34 to grip and hold a plurality of bales of hay or straw therebetween. A collar 42 is dependingly carried by the lower end of the tubular member 23, and trained through the collar 42 is a cable 43 which has its opposite ends secured to brackets 44 and 45 which are secured, as by welding, to the side straps 33 and 34 respectively.

The tubular member 23 is provided with a pair of longitudinally opposed slots 46, Figures 4 and 5, through which projects the bolt 26, so that the tubular member 23 is free to move vertically in the housing 22.

Referring to Figures 6, 7 and 8, the bale stacker has the same construction as the device of Figures 1 to 5, substantially, except that the brackets 44 and 45 are omitted. Thus, a first arm 47 has one end secured to the side strap 33, and a second superposed arm 48 has one end secured, as by welding, to the side strap 34. The arms 47 and 48 are provided with longitudinally extending slots 49 and 50 respectively, and a pin 51 projects through the slots 49 and 50, and the pin 51 is carried by the lower end of the tubular member 23. In Figure 9, there is shown a modified arrangement of the housing 22 and tubular member 23. Thus, a coil spring 52 has one end connected to the housing 22 by means of a pin 53. A pin 54 connects the other end of the coil spring to the tubular member 23, and the coil spring normally urges the tubular member 23 to its uppermost position.

Figures 2, 3:
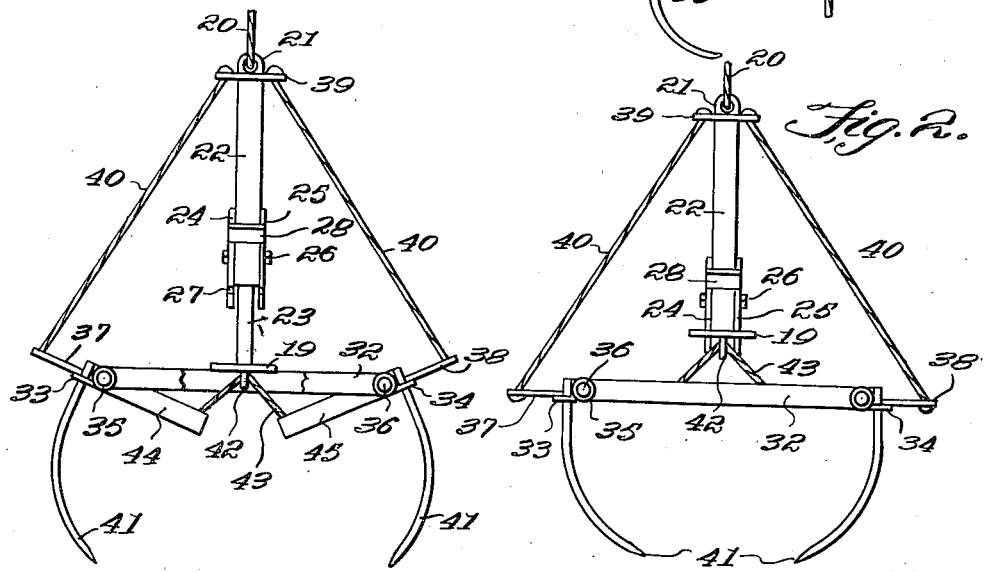
Figure 2 is an end elevational view of the device in closed position.
Figure 3 is an end elevational view, with parts broken away, and showing the position of the various parts when the device is opened.

In using the device of Figures 1 to 5, the bale stacker is arranged in open position as shown in Figure 3. The hooks 41 on the strap 33 and the hooks 41 on the strap 34 coact to grasp therebetween a plurality of bales of hay or the like. Thus, before the bales are lifted, the hooks 41 on the straps are moved toward each other to the position as shown in Figure 2, whereupon the bales will be held securely therebetween during the movement thereof. Then, the entire stacker is lifted by means of the cable 20 which extends from a suitable hoist, and when the stacker carrying the bales is at the desired location, the user pulls on or actuates the cable 30. This causes pivotal movement of the strips 24 and 25 which allows the tubular member 23 to move downwardly whereupon the bales will be released by the hooks 41.

In Figures 6, 7 and 8, the operation of the device is the same, except that arms 47 and 48 are provided. When the bales are being elevated, the arms 47 and 48 assume the position as shown in Figure 6, and when the strap 30 is actuated, the tubular member 23 drops so that the arms 47 and 48 assume the position shown in Figure 7, whereby the bales can be released at the desired location.

By using the aforementioned bale stacking device, as many as eight bales of hay can be elevated or conveyed at one time, and the bales will be carried in such a manner so as to prevent breaking or damaging to the bales. When the cable 30 is pulled, the bales will be released and then they can be placed in position on a truck or stack, thus eliminating unnecessary handling by hand.

From the foregoing description it is obvious that a bale stacker constructed in accordance with my invention is particularly well adapted for use by reason of the convenience and facility with which it may be used.

I claim:

1. A bale stacker, comprising a hollow housing adapted to be connected to a hoist, a plate arranged across the top of said housing and secured thereto, a tubular member mounted for telescopic movement in said housing, a latch bar arranged transversely with respect to the lower end of said tubular member and secured thereto, a pair of strips arranged on opposite sides of said housing and pivotally connected thereto, an actuating cable connected to said strips for causing pivotal movement of the latter, there being a slot arranged in each of said strips for receiving therein said latch bar to releasably maintain said tubular member in its uppermost position, a collar secured to the lower end of said tubular member, a pair of spaced parallel side straps arranged below said tubular member, a pair of spaced parallel end bars extending between said side straps and hingedly connected to said side straps, a finger projecting from each of said side straps, a cable extending between each of said fingers and said plate, a plurality of coacting curved hooks arranged in spaced relation along each of said side straps and secured thereto, a bracket secured to the inner surface of each of said side straps, and a cable trained through said collar and having its ends secured to said brackets.

2. A bale stacker, comprising a hollow housing adapted to be connected to a hoist, a plate secured to said housing, a tubular member mounted for telescopic movement in said housing, a latch bar arranged transversely with respect to the lower end of said tubular member and secured thereto, a pair of strips pivotally connected to said housing, an actuating cable connected to said strips for causing pivotal movement of the latter, there being a slot arranged in each of said strips for receiving therein said latch bar to releasably maintain said tubular member in its uppermost position, a collar secured to the lower end of said tubular member, a pair of side straps arranged below said tubular member, a pair of end bars extending between said side straps and hingedly connected to said side straps, a finger projecting from each of said side straps, a cable extending between each of said fingers and said plate, a plurality of coacting hooks arranged in spaced relation along each of said straps and secured thereto, a bracket secured to the inner surface of each of said side straps, and a cable trained through said collar and having its ends secured to said brackets.

GRANT L. BATES.

REFERENCES CITED

The following references are of record in the file of this patent:

UNITED STATES PATENTS

| Number | Name | Date |
|---|---|---|
| 1,167,785 | Searcy et al. | Jan. 11, 1916 |
| 1,462,787 | Degendorfer | July 24, 1923 |

FOREIGN PATENTS

| Number | Country | Date |
|---|---|---|
| 32,132 | Sweden | Sept. 22, 1910 |